(12) United States Patent
Thomas

(10) Patent No.: US 8,116,456 B2
(45) Date of Patent: Feb. 14, 2012

(54) TECHNIQUES FOR MANAGING HETEROGENEOUS KEY STORES

(75) Inventor: James Gordon Thomas, Pleasant Grove, UT (US)

(73) Assignee: Oracle International Corporation, Redwood Shores, CA (US)

( * ) Notice: Subject to any disclaimer, the term of this patent is extended or adjusted under 35 U.S.C. 154(b) by 1230 days.

(21) Appl. No.: 11/605,067

(22) Filed: Nov. 28, 2006

(65) Prior Publication Data

US 2008/0123855 A1 May 29, 2008

(51) Int. Cl.
 H04L 9/00 (2006.01)
 H04L 29/06 (2006.01)
(52) U.S. Cl. .................... 380/277; 713/153
(58) Field of Classification Search .......... 380/277, 380/286; 713/153, 160
 See application file for complete search history.

(56) References Cited

U.S. PATENT DOCUMENTS

| | | | |
|---|---|---|---|
| 5,872,849 A * | 2/1999 | Sudia | 713/175 |
| 6,738,907 B1 | 5/2004 | Carter | |
| 6,760,843 B1 | 7/2004 | Carter | |
| 6,959,381 B2 | 10/2005 | Wheeler et al. | |
| 6,978,367 B1 * | 12/2005 | Hind et al. | 713/167 |
| 7,096,354 B2 | 8/2006 | Wheeler et al. | |
| 7,096,505 B2 * | 8/2006 | Vasudevan et al. | 726/30 |
| 7,120,253 B2 * | 10/2006 | Ducharme et al. | 380/211 |
| 7,380,120 B1 * | 5/2008 | Garcia | 713/160 |
| 7,496,199 B2 * | 2/2009 | Camus et al. | 380/247 |
| 7,823,190 B1 * | 10/2010 | Kacarov et al. | 726/6 |
| 2001/0050990 A1 * | 12/2001 | Sudia | 380/286 |
| 2003/0097565 A1 | 5/2003 | Wheeler et al. | |
| 2003/0097573 A1 | 5/2003 | Wheeler et al. | |
| 2004/0039925 A1 * | 2/2004 | McMillan et al. | 713/189 |
| 2004/0268124 A1 * | 12/2004 | Narayanan | 713/164 |
| 2006/0115089 A1 | 6/2006 | Carter et al. | |
| 2006/0236096 A1 * | 10/2006 | Pelton et al. | 713/155 |
| 2006/0291664 A1 * | 12/2006 | Suarez et al. | 380/286 |

* cited by examiner

*Primary Examiner* — Nathan Flynn
*Assistant Examiner* — Abdullah Almamun
(74) *Attorney, Agent, or Firm* — Kilpatrick Townsend & Stockton LLP

(57) ABSTRACT

Techniques for managing heterogeneous key stores are presented. A centralized key management service receives key instructions in a generic format. These key instructions are communicated to distributed key agents distributed over a network. The key agents translate the key instructions into native formats expected by distributed key stores. The key agents then process the key instructions in the native formats against the distributed key stores on behalf of the centralized key management service.

20 Claims, 5 Drawing Sheets

| | |
|---|---|
| 401 -- DISTRIBUTE KEY STORE IDENTIFIER | IDENTIFIES DISTRIBUTED KEY STORE |
| 402 -- CATEGORY TYPE | CATEGORY OF KEY STORES |
| 403 -- PATH | LOCATION OF KEY STORE |
| 404 -- ACCESS SECRET | GRANTS ACCESS TO KEY STORE |
| 405 -- KEY STORE ELEMENTS | KEY INFORMATION IN KEY STORE |
| 406 -- FLAG | INCLUDE JUST TRUSTED ROOTS |
| 407 -- RESOURCE IDENTIFIER | IDENTIFIES RESOURCE ACCESSING |
| 408 -- TREE STRUCTURE | TREE RELATIONSHIP OF STORE |
| 409 -- SERVER IDENTIFIER | IDENTIFIES KEY GENERATION SERVICE |
| 410 -- TRUST CONTAINER | REPRESENTS DIRECTORY NAME |
| 411 -- IP ADDRESS | USED TO CONNECT TO STORE |
| 412 -- PORT IDENTIFIER | IDENTIFIES PREDEFINED STORE PORT |
| 413 -- POST UPDATE COMMAND | IDENTIFIES COMMAND TO INVOKE |

TECHNIQUES FOR MANAGING HETEROGENEOUS KEY STORES

FIELD

The invention relates generally to security and more particularly to techniques for managing heterogeneous key stores.

BACKGROUND

Enterprises are increasingly securing their electronic assets using a variety of software architectures, machines, and software services. The problem is that the enterprises and their machines, assets, services, etc. evolve over time. So, newer machines and services may be used to piecemeal replace failing resources or even to expand the enterprise as needed. In other cases, improved security software services may be released within the industry, but the enterprise may only be capable of achieving spotty deployment based on legacy efforts needed for a full scale integration of the security services. In still other cases, some existing services may be upgraded and require newer software services while other existing services are incapable with the newer software services.

Quickly, even the best managed enterprise will devolve in time into a heterogeneous security environment in which disparate devices and services are managed by varying degrees of security. For example, an enterprise may have multiple security databases on multiple computers. Here, two or more computers may participate in secure transactions with one another, such that each software service on each computer requires access to private and public keys for the transactions to succeed. The storage and management of these keys are provided via the security databases. Many security databases are specific to a platform or execution environment in which they operate (e.g., Java Platform Enterprise Edition (J2EE), etc.). Administrators in these environments must maintain each security database on each separate computer with the proper key information required by the software services that use them, so that the distributed computing components can properly interact with one another.

As another example, various software services running on various different computers within a network may require different types of security databases for keys. Some common types include Java key stores, privacy-enhanced electronic mail (PEM), distinguished encoding rules (DER), etc. Security software services are designed to work with specific types of security databases. Thus, managing keys housed in different types of security databases results in using different key management tools, which are specific to certain execution environments and specific to certain security database types. Consequently, administrators operating under these circumstances must understand and be proficient in all the key management tools required to manage their different types of security databases. Moreover, keeping various security databases aligned and in synchronization with one another can be full of mind-numbing detail and also fraught with many opportunities to get just one thing wrong and thereby render the entire enterprise environment inoperable.

Essentially, security administrators are limited to working with only the set of keys in a single security database that can be managed through the key management tool that operates with that single security database. Therefore, a full inventory of keys within a network or enterprise may require running each of the available key management tools against each of the available security databases on each of the computers being managed. This complicates various tasks associated with key administration, such as: identifying and updating expiring certificates; generating keys and certificate signing requests (CSR's) for new keys that need to be signed by a certificate authority (CA); assigning keys to an appropriate security database; and migrating keys to different hardware (this may also unduly expose confidential information (private keys) on the network wire).

Thus, what is needed is a mechanism that allows for more efficient and flexible management of keys in heterogeneous environments.

SUMMARY

In various embodiments, techniques for managing heterogeneous key stores are provided. More specifically, and in an embodiment, a method is presented for centralized key management. Initially, a key instruction is received in a first format; the key instruction is directed to a first key store and a second key store. The first and second key stores use disparate interfaces from one another and use second and third formats, respectively, to process instructions. Next, the key instruction is sent in the first format to a first agent, who is in communication with the first key store, and the first agent translates the key instruction from the first format to the second format and then processes the key instruction against the first key store. Also, the key instruction is forwarded in the first format to a second agent that is in communication with the second key store, and the second agent translates the key instruction from the first format to the third format and then processes the key instruction against the second key store.

BRIEF DESCRIPTION OF THE DRAWINGS

FIG. 4 is a diagram of a centralized key store, according to an example embodiment.

DETAILED DESCRIPTION

A "key" as used herein refers to any piece of electronic information that is considered confidential and secret, the possession of which may provide access to a resource. A resource may be physical (e.g., processing device, database, directory, etc.) or logical (e.g., user, automated service, etc.). A key may be used to unlock encryption for data or communications or a key may be used to provide access to a particular resource, environment, set of resources, and/or set of environments. In some cases, a key may be symmetrical or asymmetrical. In an embodiment, the keys may be public and private key pairs associated with Public Key Infrastructure (PKI) techniques. In another embodiment, a key may be a password, a piece of confidential information used by a resource (e.g., Social Security Number (SSN), driver license number, salary, zip code, etc.), biometric data, etc.

A "key store" is a physical or logical device that houses keys and information about keys. The key store may be a directory, a file, a database, a data warehouse, a physical storage device, a removable and portable storage device or media, or various combinations of these things integrated with one another.

Various embodiments of this invention can be implemented in existing network architectures, security systems, data centers, and/or communication devices. For example, in some embodiments, the techniques presented herein are implemented in whole or in part in the Novell® Access Manager® product, proxy server products, email products, operating system products, XML products, data center products, identity-based products, and/or directory services products distributed by Novell®, Inc., of Provo, Utah.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-4.

Figure 1:
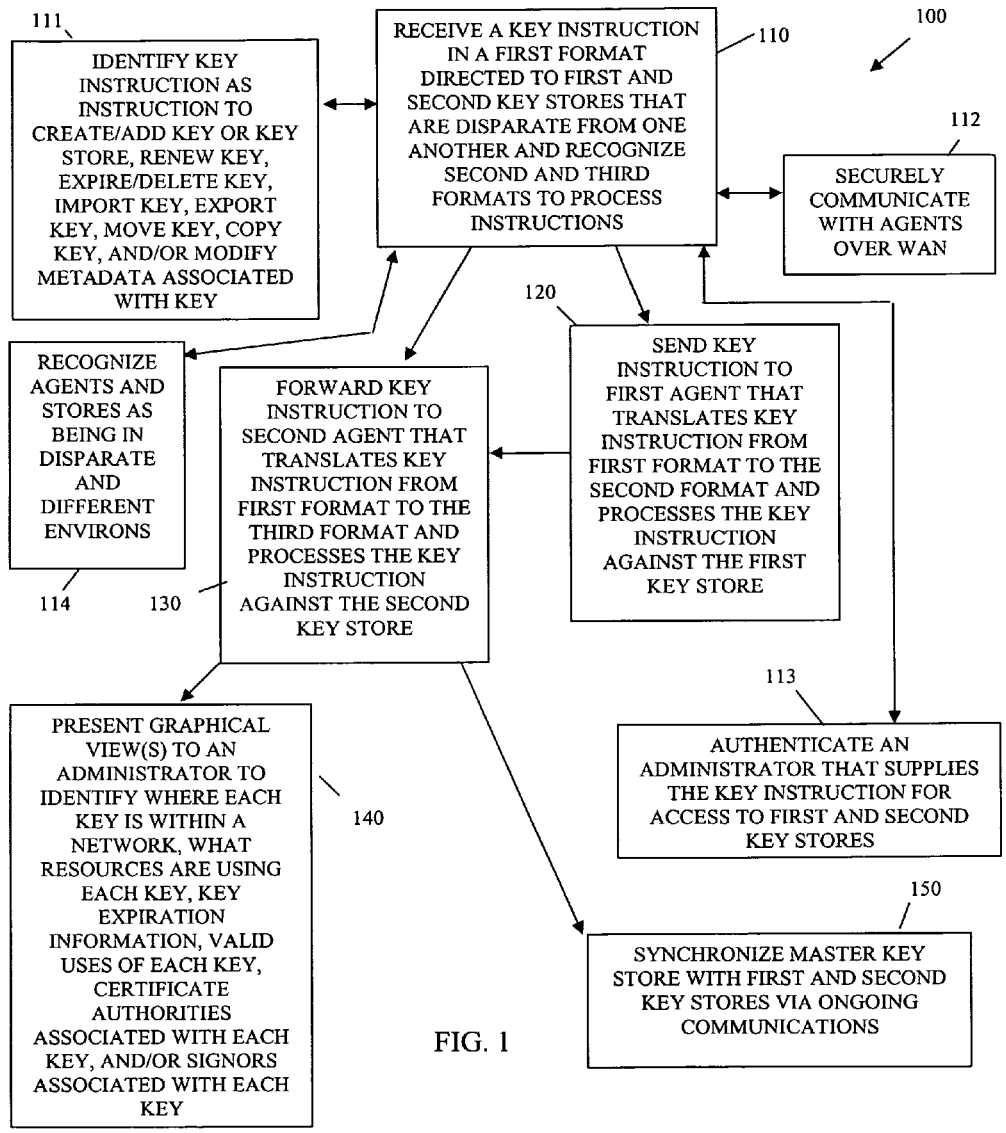
FIG. 1 is a diagram of a method for centralized key management, according to an example embodiment.

FIG. 1 is a diagram of a method 100 for centralized key management, according to an example embodiment. The method 100 (hereinafter "centralized key management service") is implemented as instructions in a machine-accessible and readable medium. The instructions when executed by a machine perform the processing depicted in FIG. 1. The centralized key management service is also operational over and processed within a network. The network may be wired, wireless, or a combination of wired and wireless. In some cases, the network is a wide area network (WAN), such as the Internet, and accessible via the World-Wide Web (WWW).

Initially, the centralized key management service is configured to operate over the network and have access to a centralized key store. It interacts with a plurality of distributed key stores over the network via key agents. The processing associated with the key agents is described more completely below with reference to the method 200 of the FIG. 2. The centralized key management service also includes a front-end interface representing an administrative console or tool that an administrator uses to manage keys and information about keys across the entire network.

At 110, the centralized key management service receives a key instruction in a first or generic format. The key instruction is received from a resource, such as an administrator that is interacting with the centralized key management service via an administrative console or tool. It may also be the case that the key instruction is received from an automated service or application that uses an Application Programming Interface (API) recognized by the centralized key management service.

The key instruction is directed to first and second key stores over the network. The first and second key stores use disparate interfaces or management tools from one another and process instructions in second and third formats, respective, where the second and third formats are different from what is expected and used by the centralized key management service.

According to an embodiment, at 111, the centralized key management service may identify the key instruction as being an instruction to perform commands on the first and second key stores for purposes of: creating or adding a new key, renewing an existing key, expiring or deleting an existing key, importing a new key or existing key, exporting an existing key, copy an existing key, modifying metadata associated with an existing key, etc. It is understood that other operations may be requested via the key instruction as well and embodiments of the invention should not be limited to only the examples described.

In an embodiment, at 112, the communications between the centralized key management service and the first and second agents associated with the first and second key stores, discussed more completely below, may be achieved via secure communication channels or mechanisms, such as but not limited to, secure sockets layer (SSL), etc.

Additionally, at 113, and in some embodiments, any administrator that supplies the initial key instruction may first be authenticated to access both the first and second key stores according to policy. Any authentication mechanism may be used to achieve this authentication and policy may drive the types of key instructions that the authenticated administrator may submit to the centralized key management service via an administration console or tool interface.

In still more situations, at 114, the centralized key management service may recognize that the first and second agents (described below) and the first and second stores as being associated with disparate and different environments or devices. That is, each environment, device, or set of API's associated with each key store is different from the remaining key store's environment, device, or set of API's.

It is also initially noted that although only two agents and key stores are presented herein that there is in fact no limit on the number of disparate key stores and agents that can be used with the teachings presented herein. Moreover, a single agent may perform front-end processing on behalf of more than one key store.

At 120, the centralized key management service sends the key instruction in its first data format or generic data format over the network to a first agent associated with a first key store. When the first agent receives the key instruction, it translates the key instruction into a second format that is expected and recognized by the first key store and then processes the translated key instruction against the first key store on behalf of the centralized key management service. In other words, the first agent acts as a front-end interface to the API or management tools associated with the first key store for purposes of translating and processing the original key instruction against the first key store in its native API or management tool format (second format). It is noted that the first key store and its original API or management tool does not have to be aware of the translation and does not require any modification for this to work. It is the first agent that acts as a front-end to the first key store that handles any necessary translation from the first format of the original key instruction to the second format expected by the first key store.

In a similar manner, at 130, the centralized key management service forwards the key instruction to a second agent associated with the second key store. That second agent translates the key instruction into a third format expected and recognized by an API or management tool of the second key store and then processes the translated key instruction against the second key store.

The processing depicted at 120 and 130 can occur in a parallel or concurrent fashion or in reverse order, such that 120 occurs serially after 130 or vice versa. The point is that the centralized key management service sends the key instruction for processing to at least two separate key stores, each having a key agent that translates and interfaces with a particular one of the key stores. It is noted that in some embodiments, the centralized key management service may actually send the key instruction to a single external and separate key store and not to a plurality of key stores.

In an embodiment, at 140, the centralized key management service may also present a variety of graphical views to an administrator for purposes of permitting the administrator to centrally manage and view keys and key information associated with a given network. Some example views may visually depict: where each key is within the network, what resources are consuming or using which keys, key expiration information, valid uses of each key, certificate authorities for the keys, signors associated with each key, etc.

In still another processing arrangement, at 150, the centralized key management service may actively synchronize with the first and second key stores via ongoing communications among the centralized key management service and the first and second key agents. In other words, the key agents may be designed to dynamically push local changes occurring in their key stores to the centralized key management service for modification to a centralized key store being maintained and managed by the centralized key management service. In other cases, the centralized key management service may push requests periodically to the key agents to supply all modifications from a last request.

The centralized key management service presents a unified and generic key management interface to an administrator or to automated services that permit generic format key instructions to be distributed to key agents over the network in the generic format. The key agents have knowledge as to the format expected by their key stores and translate key instructions into the proper formats and then process the instructions against the key stores. In this manner, a centralized key management service is achieved with heterogeneous (disparate) key stores associated with disparate and different environments, devices, and/or software services.

The centralized key management service may be used to provide a variety of other features to an administrator beyond what has been described above. For example, various configuration settings may be established for a centralized key store. One example is settings associated with Certificates (type of key), such as X.509 certificates. Thus, it may be established that keys are to be managed as x.509 certificates. These certificates are stored in a master or centralized key store managed and maintained by the centralized key management service. The administrator may then use other interfaces associated with the centralized key management service to: create new certificates (including private keys), create certificate signing request (CSR's), delete certificates, import certificates, export certificates for public keys, export certificates for private keys, renew certificates (export CSR to be resigned and import the new signed certificate), import trusted roots, create key stores within the network, add certificates to key stores, remove certificates from key stores, view a list of available key stores, view a list of available certificates, etc.

The format and usage of key instructions representing commands is described more completely below with reference to the key agent processing of the FIG. 2 and the method 200. Furthermore, in some embodiments communication between the centralized key management service and the key agents may be achieved via SSL using Hyper Text Transfer Protocol (HTTP) over SSL (HTTPS). It is noted that non secure mechanisms may be used although this would expose any key information being transmitted over the network. An HTTP approach may use a POST operation. The posted data includes the name value pairs followed by, when necessary, a byte array of data which constitutes the certificates being sent. The number of bytes of data that constitute the name value pairs is parsed as an HTTP header. Data posted beyond the length of the name value pairs is regarded as payload data. The payload data is the actual certificate being sent with the command and which the key agents will use to successfully carry out the command (key instruction).

The agents and the centralized key management service are in trusted relationships with one another. This can be done via a trust store maintained by the agents to identify the centralized key management service and a trust store maintained by the centralized key management service for the agents. Although it is noted that any mechanism to establish trust between the centralized key management service and the agents may be used herein.

Figure 2:
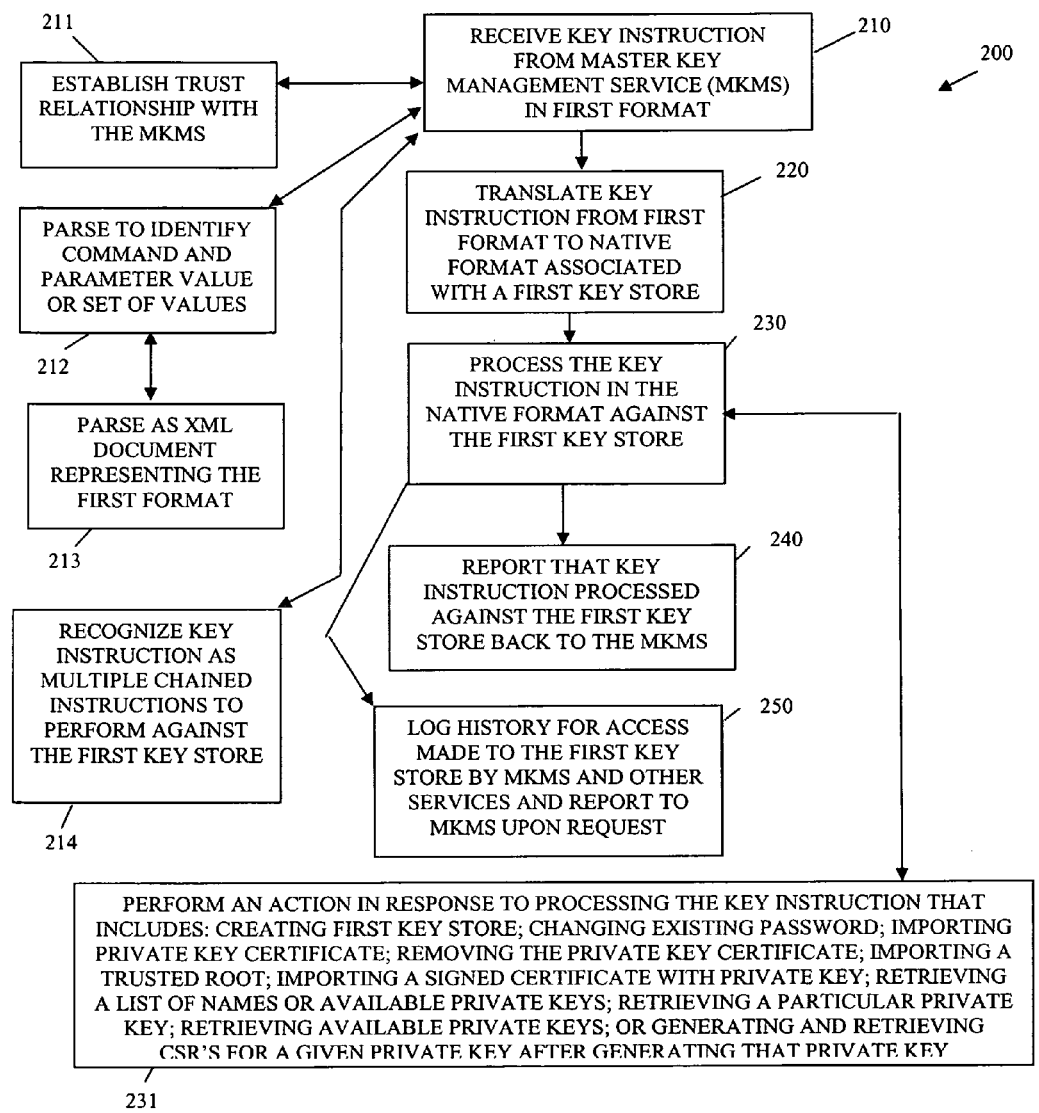
FIG. 2 is a diagram of a method for distributed key management, according to an example embodiment.

FIG. 2 is a diagram of a method 200 for distributed key management, according to an example embodiment. The method 200 (hereinafter "distributed key agent service" is implemented in a machine-accessible and readable medium as instructions. The instructions when executed by a machine perform the processing depicted in the FIG. 2. Moreover, the distributed key agent service is operational over a network, and the network may be wired, wireless, or a combination of wired and wireless. The distributed key agent service interacts with the centralized key management service represented by the method 100 and discussed above within the context of the FIG. 1.

The distributed key agent service may manage a plurality of key stores over the network on behalf of the centralized key management service (the method 100 of the FIG. 1). A network configuration may include a plurality of distributed key agent services. Each distributed key agent service translates key instructions received from the centralized key management service in a generic format to native formats expected by key stores that the distributed key agent service manages.

At 210, the distributed key agent service receives a key instruction from a master (centralized) key management service in a first (generic format). In an embodiment, the master key management service is the centralized key management service represented by the method 100 of the FIG. 1. According to an embodiment, at 211, and before the key instruction is received, the distributed key agent service and the master key management service establish a trust and secure relationship with one another.

According to an embodiment, at 212, the distributed key agent service may parse the key instruction in the first format to identify a command that is to be processed on a first key store that is being managed by the distributed key agent service. The distributed key agent service may also parse a parameter value or set of values for the command. So, the key instruction may be in a format such as "cmd=value," where "cmd" is a command name or index into a command table to acquire a command name and "=" is a separator (any separator character may be used and it does not have to be a equal sign character) and "value" is a specific parameter value. Armed with this information parsed from the key instruction, the distributed key agent service may translate the information into an instruction or command recognized and expected by the first key store that the distributed key agent service manages.

In some cases, at 213, the key instruction may be received as an extensible markup language (XML) document representing the first format. Thus, the distributed key agent service may use an XML schema definition (XSD) in connection with an XML parser to acquire the command name and value pairs from the key instruction and perhaps even use extensible style sheets language (XSL) translators (XSLT) to perform the necessary translation to the native format expected by the first key store. In this manner, the distributed key agent service may be generic and may in some cases be deployed for a variety of different key stores across the network where each instance of the distributed key agent service uses a particular XSD, XSL, and XSLT to directly interact with a particular legacy key store.

According to still another embodiment, at 214, the distributed key agent service may recognize the key instruction as multiple chained instructions that are to be processed against the first key store. In other words, the key instruction may actually be a series of multiple commands to process one after the other or in a defined order against the first key store.

At 220, the distributed key agent service translates the key instruction received from the master key management service from the first format (generic format) to a native format associated with an API or management tool of the first key store. Again, this may be done in manners that are specifically known to the distributed key agent service or may be done in a more generic fashion, such as what was described above with respect to XML technology and tools.

At 230, the distributed key agent service processes or causes to process the key instruction in the native format against the first key store. Here, the distributed key agent service causes the API or management tool to process the key instruction in the native format and calls expected by the API or management tool of the first key store.

In an embodiment, at 231, the actual commands processed against the key store can vary. For example, commands may dictate that the distributed key agent service: create the first key store (assuming that it is not existing and this is a first time operation); change an existing access password to the first key store; import a private key certificate into the first key store; remove a private key certificate from the first key store; import a trusted root into the first key store; import a signed certificate with a private key; retrieve a list of names or available private keys; retrieve a particular private key; retrieve available private keys; generate and retrieve CSR's for a given private key after generating that private key, etc.

At 240, the distributed key agent service reports back to the master key management service that the key instruction successfully or did not successfully process against the first key store. It may be, as described within the context the process of 231, that the master key management service expects some information back beyond just a notification, such as when a key is expected, etc. Thus, the reporting performed at 240 may be representative of any results expected by the master key management service in response to its originally submitted key instruction.

In an embodiment, at 250, the distributed key agent service may also log a history of accesses made to the first key store, which are directed by the master key management service or even other services. The other services may be local to the first key store or other external and remote services having proper access to the first key store. The distributed key agent service may communicate the history upon request of the master key management service. In some cases, the history may serve as an audit trail or may even serve as a synchronization mechanism.

It is now appreciated how a centralized key management service having a centralized key store using a generic interface may cooperate beneficially with multiple distributed key agent services to manage heterogeneous and even legacy key stores having keys and key information. This accounts for the practicalities of modern security architectures and provides ready integration into those architectures with centralized management capabilities.

Figure 3:
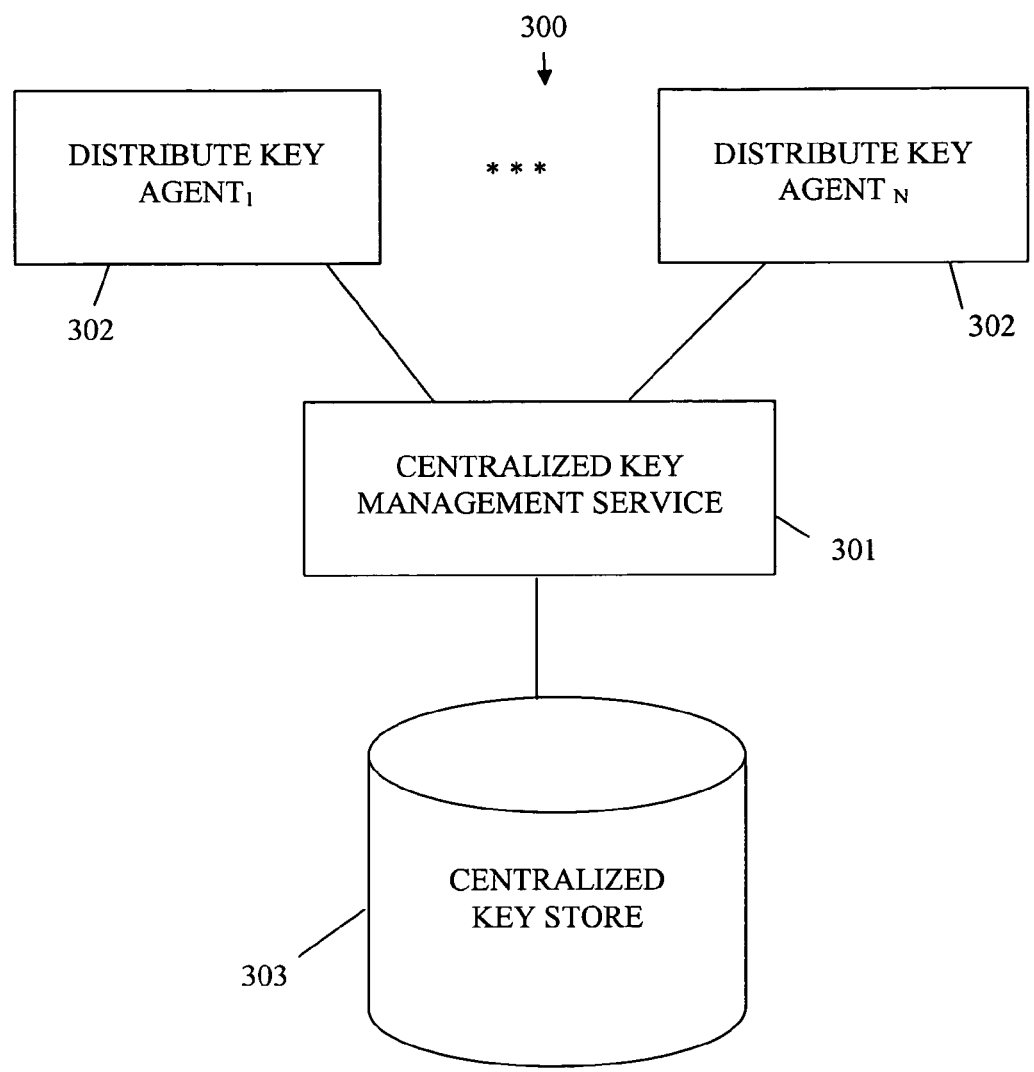
FIG. 3 is a diagram of a key management system, according to an example embodiment.

FIG. 3 is a diagram of a key management system 300, according to an example embodiment. The key management system 300 is implemented as instructions on or within a machine-accessible and readable medium. The instructions when executed by a machine perform processing depicted with respect to the methods 100 and 200 of the FIGS. 1 and 2, respectively. The key management system 300 is also operational over a network and the network may be wired, wireless, or a combination of wired and wireless.

The key management system 300 includes a centralized key management service 301 and a plurality of distributed key agents 302. In some cases the key management system 300 may also include a centralized key store 303. Each of these and their interactions with one another will now be discussed in turn.

Example processing associated with a centralized key management service 301 was provided above with reference to the method 100 of the FIG. 1. The centralized key management service 301 presents a front-end administrative interface or tool to administrators from which keys and key information about those keys may be centrally managed using a unified tool or interface, namely the centralized management service 301 or API's associated therewith.

The centralized key management service 301 permits administrators to form and issue key instructions in a generic data format. The generic formatted key instructions are then communicated to the appropriate distributed key agents 302 over a network for subsequent processing on the proper distributed key stores.

The centralized key management service 301 also presents custom views to the administrators; the views can be used by the administrators to discern information about or regarding keys appearing in the network and/or in each of the distributed key stores.

The centralized key management service 301 may also resolve whether particular key instruction category types (e.g., certificate creation, key store creation, certificate revocation, etc.) for administrator provided key instructions are permissible in view of policy and identity information associated with the administrator. That is, some key instructions may be impermissible to a particular administrator while others are permissible. Before impermissible key instructions are processed to distributed key agents 302, the centralized key management service 301 may enforce policy and identity-based restrictions on administrators proffering the impermissible key instructions.

The distributed key agents 302 and the centralized key management service 301 cooperate with one another to synchronize the distributed key stores and are managed by the distributed key agents 302; the centralized key store 303 is managed by the centralized key management service 301. Synchronization can occur in a variety of manners such as: via pushed updates that occur in real time or near real time from each of the distributed key stores to the centralized key management store 303; via pull requests where the centralized key management service 301 periodically requests history or updates from a last synchronization from the distributed key agents 302; via a scheduled synchronization where the distributed key agents 302 report on updates at predefined intervals or periods; etc.

Each distributed key agent 302 manages one or more distributed key stores. Each distributed key store includes key and key information for its local environment or resources and includes its own API or management too. At least two distributed key stores are disparate or different meaning that they operate on different devices, machines, or environments and have different and incompatible API's or management tools.

Each distributed key agent 302 is designed to act as an intermediary between the centralized key management service 301 and one or more API's or management tools associated with one or more distributed key stores. The centralized key management service 301 issues key instructions received from administrators in a generic format to the distributed key agents 302. The distributed key agents 302 translate the generic format of the key instructions to native formats recognized by their distributed key stores and then process the translated key instructions against the distributed key stores. Example processing associated with a distributed key agent 302 was presented above with respect to the method 200 of the FIG. 2.

The key management system 300 may also include a centralized key store 303. The centralized key store 303 includes keys and key information for each of the distributed key stores. The centralized key management service 301 manages the centralized key store 303 for purposes of keeping the keys and key information associated with a plurality of heterogeneous distributed key stores in a generic and unified format. This format combined with an API associated with the centralized key management service 301 permits administrators to manage the keys and key information of the network and to visualize and mine the state and performance of the keys and key information of the network. A more detailed view of the centralized key store 303 is presented below with respect to the FIG. 4.

FIG. 4 is a diagram of a centralized key store 400, according to an example embodiment. The centralized key store 400 is implemented on or within a machine-accessible and readable medium. The centralized key store 400 when accessed by the processing depicted above with respect to the method 100 of the FIG. 1 provides access information for resources of a network. The network may be wired, wireless, or a combination of wired and wireless.

The centralized key store 400 includes a plurality of records each record including a distributed key identifier 401, a category type 402, a path 403, an access secret 404, and a plurality of key store elements 405. In some cases, the centralized key store 400 may also include one or more of the following: a flag 406, a resource identifier 407, a tree structure 408, a server identifier 409, a trust container structure 410, an Internet Protocol (IP) address 411, a port identifier 412, and a post update command 413. Access to the centralized key store 400 may also be controlled via an Application Programming Interface (API) 420 set of commands or modules. Each of these and their interactions with one another will now be discussed in turn.

The distributed key identifier 401 identifies a particular distributed key store via a unique identifier. Other tables or relationships within the centralized key store 400 may associate the distributed key identifier 401 with a particular distributed key agent or set of agents.

It is also noted that in some cases, each of the distributed key agents may also locally store the information 401-413. This assists each distributed key agent to properly translate from the generic format to a desired format that is needed by a particular distributed key store that the distributed key agent manages. The distributed agent then identifies a particular distributed key store in response to a distributed key identifier 401. So, rather than continuously interacting with the centralized key store 400 and its information 401-413 for a particular record associated with a particular distributed key store, an agent may have a synchronized copy of some or all of the information 401-403 and use that to properly map to the format recognized by the distributed key store.

The category type 402 specifies a type associated with the distributed key store, such as Java, PEM, etc. Operations and formatting may be discovered or driven by the category type 402. The access secret 404 may be viewed as a password or other type of secret that is used to access and perform administrative functions against the distributed key store. The plurality of key store elements 405 is used to define keys and key information that may be included in the distributed key store.

In some embodiments, the centralized key store 400 records may each also include a variety of other information. For example, a flag 406 may be used to indicate whether the distributed key store includes just trusted roots. A resource identifier 407 may be used to identify a resource, such as a user, that logs into the distributed key store. A tree structure 408 represents a tree relationship for the keys and key information included in the distributed key store. A server identifier 409 identifies a key generation service or server for generating keys housed in the distributed key store. A trust container structure 410 represents a directory name of the trusted roots container object for the distributed key store. The trust container structure 410 may also represent any repository that includes trusted roots; so, it may be a directory name on a file system, a container in a hierarchical database, a table name in an SQL type database, etc. An IP address 411 is used to identify the network address that is used to connect to the distributed key store. A port identifier 412 is used to identify a predefined port that is used to connect to the distributed store. A post update command identifier 413 may identify a command to invoke when an update occurs in the distributed key store; this may be used to achieve dynamic and automatic synchronization or it may be used to cause applications to reload information from an updated key store.

According to an embodiment, the centralized key store 400 is encoded in XML and may be defined by an XSD. Various desired information may be dynamically rendered from the centralized key store 400 via XSL templates and/or XSLT applications.

In another case, the records of the centralized key store 400 may be encrypted and once properly decrypted the records are in XML format. It is however noted that other formats besides XML may be used and the records do not have to be initially encrypted. For example, the records of the centralized key store 400 may be housed within the centralized key store 400 in a native database or data store format, such as eDirectory® format, distributed by Novell, Inc. of Provo, Utah.

In an embodiment, the centralized key store 400 also includes an API that permits access, creation, deletion, and/or modification to each of the records and information included in each of the records. In some cases, changes made are automatically propagated to the distributed key stores over a network and propagated in native formats expected by each of the distributed key stores. That is, the distributed key agents may receive the changes in the generic format of the centralized key store 400 and then translate automatically the changes in the native formats.

In some embodiments, policy may restrict which resources (such as administrators or automated services) can access which commands or modules associated with the API of the centralized key store 400. In this manner, security may be enforced against the centralized key store 400 via restricting access to certain records or even to certain commands or modules associated with the API of the centralized key store 400.

Figure 5:
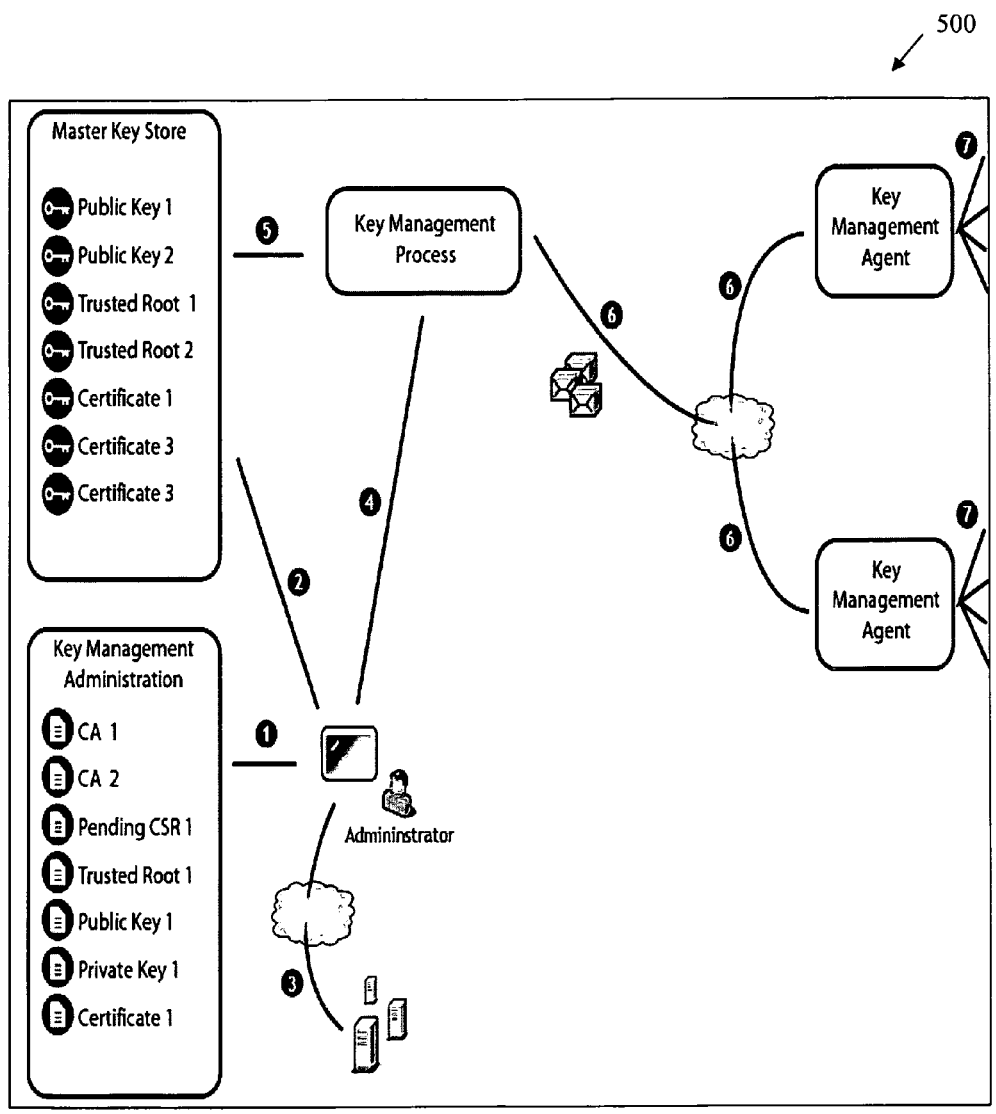
FIG. 5 is an example architecture of a key management system, according to an embodiment.

FIG. 5 is an example architecture 500 of a key management system, according to an embodiment. The example architecture 500 includes a variety of components and numbered connecting lines that identity interactions or communications between components. This example arrangement will now be discussed in detail.

The example architecture 500 is client-server based and includes various component resources and connections or interactions between the resources. Initially, an administrative resource is positioned at a processing device, such as a computer, and has access to a unified tool, such as a centralized key management service (described herein an above). The administrator uses the unified tool (administrative console via link labeled 3) to view information (via link labeled 1) regarding keys on the network and key information ("Key Management Administration" screen), such as Certificate Authority (CA) 1; CA 2; Pending CSR 1; Trusted Root 1; Public Key 1; Private Key 1; and Certificate 1. The administrator may also see (via link 2) configuration information regarding keys on the network from the "Master Key Store," such as Public Key 1; Public Key 2, Trusted Root 1; Trusted Root 2; Certificate 1; Certificate 2; and Certificate 3.

The administrator may use a secure communication link via 4 to access process various key instructions on keys and key information over the network. The centralized key management service ("Key Management Process") supplies the information via link 5 that is viewed by the administrator on the administrator console via link 2.

The centralized key management service uses links 6 to communicate key instructions in generic formats submitted by the administrator to a plurality of distributed key agents ("Key Management Agent"). Each distributed key agent uses links 7 to manage key stores 1-6 to enforce and process the key instructions in the native format and API calls recognized by each of the key stores.

The centralized key management service may process on a server over a network and each of the key agents may process as clients. The administrator console may also process as a client. It is understood that within the local environments of each distributed key agent, the particular distributed key agent may acts as a proxy or server for each of the client based key stores. Other configurations are achievable as well. It is understood that the architecture presented is provided for purposes of illustration and comprehension only and is not intended to limit the teachings presented herein to any particular arrangement.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented and residing in a non-transitory machine-readable medium and for processing on a machine, comprising:
    receiving, by the machine, a key instruction in a first format, the key instruction is directed to a first key store and a second key store, and the first and second key stores use disparate interfaces from one another and use second and third formats, respectively to process instructions, the disparate interfaces are disparate Applicant Programming Interfaces (API's) from one another and that are incompatible with one another, each API directed to a particular key store;
    sending, by the machine, the key instruction in the first format to a first agent that is in communication with the first key store, the first agent translates the key instruction from the first format to the second format and processes the key instruction against the first key store using a first API of the first key store; and
    forwarding, by the machine, the key instruction in the first format to a second agent that is in communication with the second key store, the second agent translates the key instruction from the first format to the third format and processes the key instruction against the second key store using a second API of the second key store.

2. The method of claim 1 further comprising, presenting, by the machine, one or more graphical views of keys to an administrator that identifies one or more of the following: where each key is within a network, what resources are using each key within the network, expiration information associated with each key, valid uses of each key, certificate authorities associated with each key, and signers associated with each key.

3. The method of claim 1, wherein receiving further includes identifying the key instruction as one of the following: an instruction to create a new key store, an instruction to create or add a new key, an instruction to renew an existing key, an instruction to expire or delete the existing key, an instruction to import the new key or the existing key, an instruction to export the existing key, an instruction to move the existing key, an instruction to copy the existing key, and an instruction to modify metadata associated with the existing key.

4. The method of claim 1 further comprising, securely communicating, by the machine, with the first and second agents over a wide area network (WAN).

5. The method of claim 1 further comprising, authenticating, by the machine, an administrator that supplies the key instruction before communicating the key instruction to the first and second agents, wherein the administrator is authenticated to access both the first and second key stores during authentication.

6. The method of claim 1 further comprising, synchronizing, by the machine, a master key store with the first and second key stores via ongoing communications with the first and second agents.

7. The method of claim 1, wherein identifying further includes recognizing that the first key store and first agent reside in a different and disparate environment from the second key store and the second agent.

8. A method implemented and residing in a non-transitory machine-readable medium and for executing on a machine, comprising:
    receiving, by the machine, a key instruction from a master key management service, the key instruction is in a first format;
    translating, by the machine, the key instruction from the first format to a native format associated with a first key store the native format expected by an Application Programming Interface of the first key store that is different from what is used with the master key management service and that is different from other key stores managed by the key management service, each of the Application programming interfaces are disparate from and incompatible with one another;
    processing, by the machine, the key instruction in the native format against the first key store; and
    reporting, by the machine, that the key instruction processed against the first key store to the master key management service.

9. The method of claim 8 further comprising, establishing, by the machine, a trust relationship with the master key management service before receiving the key instruction.

10. The method of claim 9 further comprising, parsing, by the machine, the key instruction in the first format to obtain a command identifier that identifies a command to process on the first key store and to obtain a corresponding parameter value or set of values to use with that command.

11. The method of claim 10, wherein parsing further includes parsing the key instruction as an extensible markup language (XML) document represented as the first format.

12. The method of claim 8 further comprising, logging, by the machine, history associated with accesses made to first key store by the key management service and by other services and reporting the history to the key management service upon request.

13. The method of claim 8, wherein receiving further includes recognizing the key instruction as multiple chained instructions to perform against the first key store.

14. The method of claim 8, wherein processing further includes performing in response to processing the key instruction on the first key store:
creating the first key store for a first time;
changing an existing password for accessing the first key store;
importing a private key certificate into the first key store;
removing the private key certificate from the first key store;
importing a trusted root into the first key store;
removing the trusted root from the first key store;
importing a signed certificate and associating it with a corresponding private key;
retrieving a list of names or available private keys that are housed in the first key store;
retrieving a particular private key from the first key store;
retrieving each of the available private keys from the first key store; and
generating and retrieving certificate signing requests (CSR's) for a given private key after generating that private key.

15. A system, comprising:
a server machine configured with a centralized key management service implemented in a non-transitory machine-readable medium and for executing on the server; and
client machines, each client machine configured with a distributed key agent and each distributed key agent implemented in a non-transitory machine-readable medium and for executing on that distributed key agent's client machine, the centralized key management service is to present a unified administrative interface to administrators to perform key instructions in a generic format, and the centralized key management service is to securely communicate the key instructions to the distributed key agents in the generic format, and each distributed key agent is to translate the key instructions into native formats recognized by distributed key stores and to further process the key instructions in those native formats on the distributed key stores on behalf of the centralized key management service, each native format associated with a particular distributed key store and that distributed key store's Application Programming Interface (API), and each API is disparate from and incompatible with remaining API's.

16. The system of claim 15 further comprising, a centralized key store, which is to be maintained and to be managed by the centralized key management service, to house keys and key information dispersed over a network in the distributed key stores, and wherein the keys and key information are housed in the centralized key store in the generic format.

17. The system of claim 15, wherein the centralized key management service is to present custom views to the administrators to discern information regarding keys appearing in a network within each of the distributed key stores.

18. The system of claim 15, wherein at least one of the distributed key agents is responsible for managing one or more of the distributed key stores.

19. The system of claim 15, wherein the centralized key management service is to resolve instruction category types for the key instructions that a particular one of the administrators may request in response to identity and policy resolution.

20. The system of claim 15, wherein the centralized key management service and the distributed key agents are to cooperate to synchronize the distribute key stores with a centralized key store maintained and managed by the centralized key management service.

* * * * *

UNITED STATES PATENT AND TRADEMARK OFFICE
CERTIFICATE OF CORRECTION

| | | |
|---|---|---|
| PATENT NO. | : 8,116,456 B2 | Page 1 of 1 |
| APPLICATION NO. | : 11/605067 | |
| DATED | : February 14, 2012 | |
| INVENTOR(S) | : Thomas | |

It is certified that error appears in the above-identified patent and that said Letters Patent is hereby corrected as shown below:

In column 11, line 64, in Claim 1, delete "Applicant" and insert -- Application --, therefor.

Signed and Sealed this
First Day of May, 2012

David J. Kappos
*Director of the United States Patent and Trademark Office*